3,522,286
METHOD OF MAKING ORGANIC BORON COMPOUNDS HAVING THE GENERAL EMPIRICAL FORMULA [RO]₃B₃O₃
Antonio Salvemini, Milan, Franco Smai, Novate Milanese, and Giuseppe Leofanti, Canegrate, Italy, assignors to Montecatini-Edison-S.p.A., Milan, Italy, a corporation of Italy
No Drawing. Filed Nov. 16, 1966, Ser. No. 594,706
Claims priority, application Italy, Nov. 26, 1965, 26,364/65
Int. Cl. C07f 5/04
U.S. Cl. 260—462       6 Claims

ABSTRACT OF THE DISCLOSURE

This disclosure relates to a method of making organic boron compounds having the general formula $[RO]_3B_3O_3$ whereby boric anhydride and aromatic esters of orthoboric acid are reacted in a reaction medium consisting of organic solvents, removable therefrom by vacuum distillation, and accelerated by this reaction medium which preferably is accompanied by a hydroxylated reaction promoter for catalyst e.g. ethylene glycol.

---

Our present invention relates to a method of making organic boron compounds having the general empirical formula $[RO]_3B_3O_3$, wherein R is an aliphatic or aromatic hydrocarbon radical and which can be identified as an alkoxy or aryloxy boroxine, as a trialkoxy- or triaryloxytriborinetrioxane, or as a trimeric alkoxy or aryloxy boric oxide, anhydride or amide.

In general, compounds of the general empirical formula $[RO]_3B_3O_3$ are considered to be trimers with a cyclic hexatomic nucleus to which the [RO] groups are attached, R being an aliphatic or aromatic hydrocarbon radical. While the direct reaction of boric anhydride and an orthoboric ester in approximately equimolar quantity has been found to yield a direct addition product with no by-products or secondary-reaction products, the reaction has proved to be impractical for many purposes because of the relative slowness of the addition reaction. Thus, in spite of the fact that the reaction, which proceeds in accordance with the following reaction scheme:

$$B_2O_3 + B[OR]_3 \rightarrow B_3O_3[OR]_3$$

has a high degree of purity and does not require separation from contaminating by-products or secondary-reaction products, the severe reaction conditions (i.e. high temperatures and reaction times) have prevented widespread use of the process on an industrial scale.

For example, it is not uncommon for this reaction, when it is carried out, to require closed vessels (e.g. autoclaves), reaction temperatures of about 250° C., and reaction times in excess of ten hours.

The organic boron compounds of the formula $[RO]_3B_3O_3$ described above are, however, of considerable practical importance since they are effective intermediates for the preparation of other organoboron derivatives and are flame-extinguishing agents for intense-combustion systems. Thus they are especially significant as fire-extinguishing agents for metals such as magnesium, titanium and alike whose reactions with oxygen are highly exothermic. Thus it is highly important to provide an industrially satisfactory and economical method of producing such organic boron compounds (i.e. alkoxy or aryloxy boroxines).

While it has been proposed heretofore to promote the addition reaction with hydroxylated organic compounds intended to serve as catalysts, it has been found that these processes are also unsatisfactory, in spite of the reduced reaction temperature, because of extensively long reaction times.

It is, accordingly, the principal object of the present invention to provide an improved method of producing alkoxy or aryloxy boroxines having the general empirical formula $[RO]_3B_3O_3$ which can be carried out at lower temperatures than have hitherto been satisfactory and yet give good yields with greatly reduced reaction times.

Still another object of this invention is to provide a process for promoting the addition reaction of an orthoboric ester and boric anhydride which yields the corresponding alkoxy or aryloxy boroxine.

A further object of this invention is to provide an improved method of making organo-oxy boroxines whereby the disadvantages of earlier systems are avoided and which is capable of yielding the boroxine in a state of high purity.

We have, surprisingly, discovered that the addition reaction of boric anhydride and organic esters in orthoboric acid can be sharply accelerated if the reaction is carried out in a reaction medium constituted of at least one and possibly more organic solvents, which may be removed from the reaction product under conditions precluding decomposition thereof.

Thus it has been discovered that the reaction $$B_2O_3 + B[OR]_3 \rightarrow [RO]_3B_3O_3$$

whereby R is an aliphatic or aromatic hydrocarbon radical (preferably having from 2 to 6 carbon atoms in the carbon skeleton of the ester) can be accelerated merely by the use of an organic solvent as a reaction medium, particularly when this solvent has a boiling point ranging between 70 and 200° C., although even higher boiling-point solvents may be used if these solvents can be removed from the reaction product (e.g. by distillation in vacuum) at temperatures below the decomposition temperature of the product boroxine. The organic solvent, moreover, is found not to contaminate the high-purity reaction product and there is substantially no interaction between the solvent, the orthoboric ester or the boric anhydride which can involve a secondary reaction.

The method of the present invention thus allows the reaction to be carried out at industrially acceptable rates even at relatively low temperatures. Furthermore, we have discovered that the use of a hydroxylated reaction promoter or catalyst is vastly more effective in lowering the reaction temperature for a given yield than is the case when the identical hydroxylated compound is used with the earlier systems. The hydroxylated reaction promoter is most advantageously a monohydric or polyhydric alcohol or a phenol; best results are obtained when the polyhydric alcohols are of the glycol type. The reaction, however, takes place at uniformly high rates (by comparison with conventional processes) even without the hydroxylated reaction promoter and is capable of yields or conversions above 90% even in relatively short periods such as several hours. The organic solvents according to this invention are preferably aliphatic hydrocarbons having a boiling point at standard pressure (atmospheric pressure) of 70 to 200° C., haloalkanes and halobenzenes, particularly chloroalkanes and chlorobenzenes, benzene, alkylbenzene or high-boiling point etheric organic compounds (i.e. having one or more ether linkages) which can be removed from the reaction product by distillation (preferably in vacuum) at temperatures below the decomposition point of the boroxine.

Most suitable are the following organic solvents: carbon tetrachloride ($CCl_4$), trichloromethane ($CHCl_3$), chlorobenzene ($C_6H_5Cl$), tetrachloroethane ($C_2H_2Cl_4$), benzene, toluene, xylene, ethylbenzene and diethylbenzene.

According to a further feature of this invention, the reaction is carried out at a temperature below the boiling point of a high-boiling aliphatic hydrocarbon or ether and between 100 and 120° C. Preferably, the reaction is effected with considerable agitation and stirring and refluxing of the solvent (i.e. at the boiling point thereof when the reaction temperature, 100 to 120° C. as preferred, is at the boiling point). The molar ratio of the boric anhydride to the solvent is preferably between 0.01 and 1 whereas the molar ratio of the orthoborate ester to the boric anhydride may range between 1 and 2. Consequently, the molar ratio of the orthoborate to the solvent should be, according to the principles of the present invention, between 0.01 and 2. The reaction promoter to $B_2O_3$ should be present in the preferred range of 1 to 5% by weight. The reaction should preferably be carried out at ambient pressure, while the most desirable reaction promoter is ethylene glycol.

The foregoing discussion of the present invention has been set forth with respect to the equimolecular adduct $B_3O_3[RO]_3$ of boric anhydride ($B_2O_3$) and the corresponding orthoborate ester $B[OR]_3$. It will be understood that the principles of this invention also apply to the preparation of other adducts of a polyboric character in which orthoboric acid esters react with boric anhydride to give compounds of the general formula $$B[OR]_3 \cdot n[B_2O_3]$$

where $n$ is a number greater than 1 but generally less than 2 and R is an aliphatic radical having a carbon number of 1 to 6 in the carbon skeleton attached to the boric-oxide nucleus or an aromatic radical (phenyl or substituted phenyl).

The invention will become more readily apparent from the following examples provided for purposes of illustration and demonstrating the best mode known to us for carrying the invention out in practice.

EXAMPLE I 6.9 g. (0.1 mole) of boric anhydride ($B_2O_3$), 10.5 g. (0.1 mole) of methyl orthoborate ($[CH_3O]_3B$) and 75 ml. of anhydrous benzene (solvent) are introduced into a three-necked 200 ml. capacity flask in one of the necks, a propeller-blade stirrer reaches into the reaction mixture while a thermometer and a refluxing condenser are mounted in the other necks. The reaction mixture is heated to the boiling point and refluxing continued with the reaction time and conversion to trimethoxyborine ($B_3O_3[OCH_3]_3$) or trimethoxytriborinetrioxane as indicated in Table I.

TABLE I

| Reaction time (minutes): | $B_3O_3[CH_3O]_3$ formed (percent by weight) |
|---|---|
| 20 | 44.8 |
| 60 | 76.7 |
| 120 | 84.2 |
| 180 | 86.5 |
| 240 | 94.5 |
| 300 | 94.5 |

From this table, it is apparent that even after only 120 minutes (i.e. 2 hours) an 84.2% of the reactants has been converted to the trimethoxy boroxine whereas after 240 minutes or 4 hours the reaction can be considered to be complete. Upon distillation in vacuo at room temperature (i.e. at a reduced pressure such that the boiling point was about 25° C.) a distillation residue was obtained which, upon infrared analysis, was found to have a boron content of 19.1% by weight, compared with a theoretical content of 18.7% in $B_3O_3[OCH_3]_3$.

EXAMPLE II

Using the apparatus of Example I, 6.9 g. of boric anhydride (0.1 mole $B_2O_3$) and 10.4 g. of methyl orthoborate (0.1 mole $[CH_3O]_3B$) were reacted in the presence of 100 ml. of carbon tetrachloride solvent. Again the quantities of trimethoxyboroxine produced at specified reaction times is listed in Table II.

TABLE II

| Reaction time (minutes): | $B_3O_3[CH_3O]_3$ formed (percent by weight) |
|---|---|
| 20 | 60.2 |
| 60 | 87.0 |
| 120 | 90.85 |
| 180 | 92.75 |
| 240 | 94.05 |
| 300 | 94.90 |

From this table, it is evident that a yield of 87% is obtainable in 1 hour while, in 2 hours, the reaction can be considered complete. Infrared analyses show the residue from a distillation of the solvent under vacuum at room temperature to be the trimethoxyboroxine, as in Example I.

EXAMPLE III

With the apparatus of Example I, 6.9 g. (0.1 mole) of $B_2O_3$ and 14.6 g. of ethylborate (0.1 mole $B[OC_1H_5]_3$) are reacted in the presence of 75 ml. of benzene and 0.2 ml. ethylene glycol (polyhydric alcohol reaction promoter). The yields of triethoxyboroxine ($B_3O_3[OC_2H_5]_3$) are given in Table III as a function of the reaction time.

TABLE III

| Reaction time (minutes): | $B_3O_3[C_2H_5O]_3$ formed (percent by weight) |
|---|---|
| 30 | 46.0 |
| 60 | 77.3 |
| 120 | 97.2 |

From this table it can be deduced that the production of triethoxyboroxine is complete within about 2 hours.

In analogous tests, but omitting the organic solvent, the time required to obtain 90% yield was invariably more than twice the reaction time in accordance with the present invention.

When trichloromethane, tetrachloroethane, monochlorobenzene, xylene, toluene, ethylbenzene and diethyl benzene were substituted for the benzene and carbon tetrachloride of Examples I–III, corresponding reaction rates and yields were obtainable. It has also been possible to obtain such yields with solvents such as hexane, heptane, octane, nonane, decane and undecane (i.e. aliphatic hydrocarbon having boiling points between 70 and 200° C.). High-boiling-point ethers such as n-butyl ether, n-amyl ether, methyl-n-butyl ether, alkylether and 1,4-dioxane were substituted as high-boiling ethers for the solvents of Examples I–III in corresponding quantities and with similar results.

For the hydroxyl-containing reaction promoter of Example III, ethyl alcohol, propyl alcohol, butyl alcohol, n-amyl alcohol, n-hexyl alchol, n-heptyl alcohol, n-octyl alcohol, allyl alcohol and propylene glycol were employed in the same quantity and with substantially similar results.

When the tripropoxy, tributoxy, tripentoxy and trihexoxy orthoborates were substituted for the orthoborate esters of Examples I–III in the indicated molar quantities, the corresponding alkyl boroxines were produced in a rapid and efficient manner.

EXAMPLE IV

Using a similar apparatus to the one described in Example I, $B_2O_3$ (6.9 g., 0.1 mole) and ethyl borate (7.3 g., 0.05 mole) were reacted at 110° C. in the presence of n-butyl ether (75 cc.) as solvent.

After one hour from the beginning of the reaction 5.9 g. of $B_2O_3$ turned out to be reacted. This meant that a polyborate had been formed the formula of which was $$B(OC_2H_5)_3 \cdot 1.7B_2O_3$$

and that 86% of $B_2O_3$ had reacted.

We claim:
1. A method of making organic boron compounds of the general empirical formula $[RO]_3B_3O_3$ wherein R is an aliphatic or aromatic hydrocarbon radical, comprising the steps of:
  (a) reacting boric anhydride with the corresponding aliphatic or aromatic ester of orthoboric acid in an organic solvent selected from the group which consists of chloroalkanes, chlorobenzenes, benzene, methyl- and ethyl-substituted benzenes and ethers having a boiling point at standard pressure of 70° to 200° C. and inert to $B_2O_3$ and to aliphatic or aromatic esters of orthoboric acid constituting a reaction medium, said reaction being carried out at a temperature between 70° and 200° C. and for a reaction time sufficient to form the organic boron compound of said formula, said boric anhydride being present in a molar ratio to said organic solvent ranging between substantially 0.01 and 1; and
  (b) thereafter recovering the organic boron compound of said formula, produced in step (a) from said solvent by distilling said solvent at reduced pressure from the reaction system at a temperature below the decomposition temperature of said compound of said formula.

2. The method defined in claim 1 wherein said organic solvent is selected from the group which consists of carbontetrachloride, trichloromethane, chlorobenzene, tetrachloroethane, benzene, toluene, xylene and ethylbenzenes.

3. The method defined in claim 1 wherein the reaction mixture contains at least one organic reaction promoter having at least one hydroxyl group per molecule.

4. The method defined in claim 3 wherein said reaction promoter is selected from the group which consists of monohydric and polyhydric alcohols and phenols.

5. The method defined in claim 4 wherein said polyhydric alcohols are glycols.

6. The method defined in claim 1 wherein the reaction is carried out at a temperature between 100° and 120° C.

References Cited
UNITED STATES PATENTS

| | | | |
|---|---|---|---|
| 2,927,124 | 3/1960 | Olmsted | 260—462 |
| 3,083,225 | 3/1963 | May | 260—462 |
| 3,099,677 | 7/1963 | Hunter | 260—462 |
| 3,253,013 | 5/1966 | De Cerrione | 260—462 |

LEON ZITVER, Primary Examiner

L. J. DeCRESCENTE, Assistant Examiner